Figure 3:
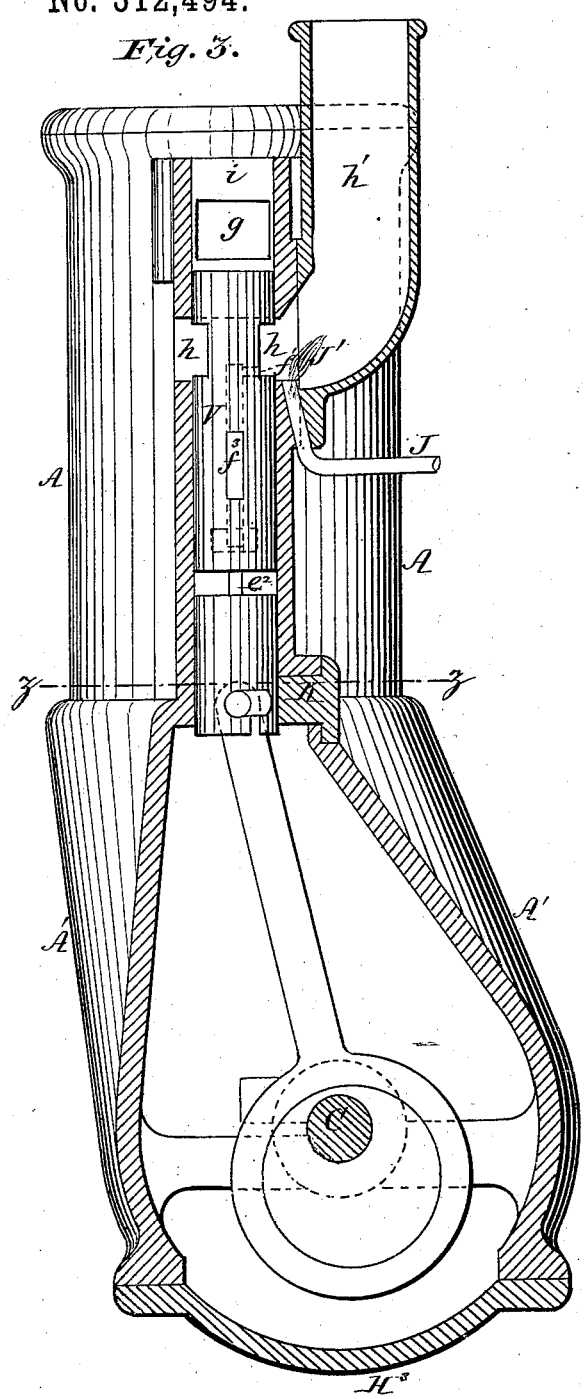

(No Model.) 3 Sheets—Sheet 1.
L. H. NASH.
GAS ENGINE.
No. 312,494. Patented Feb. 17, 1885.
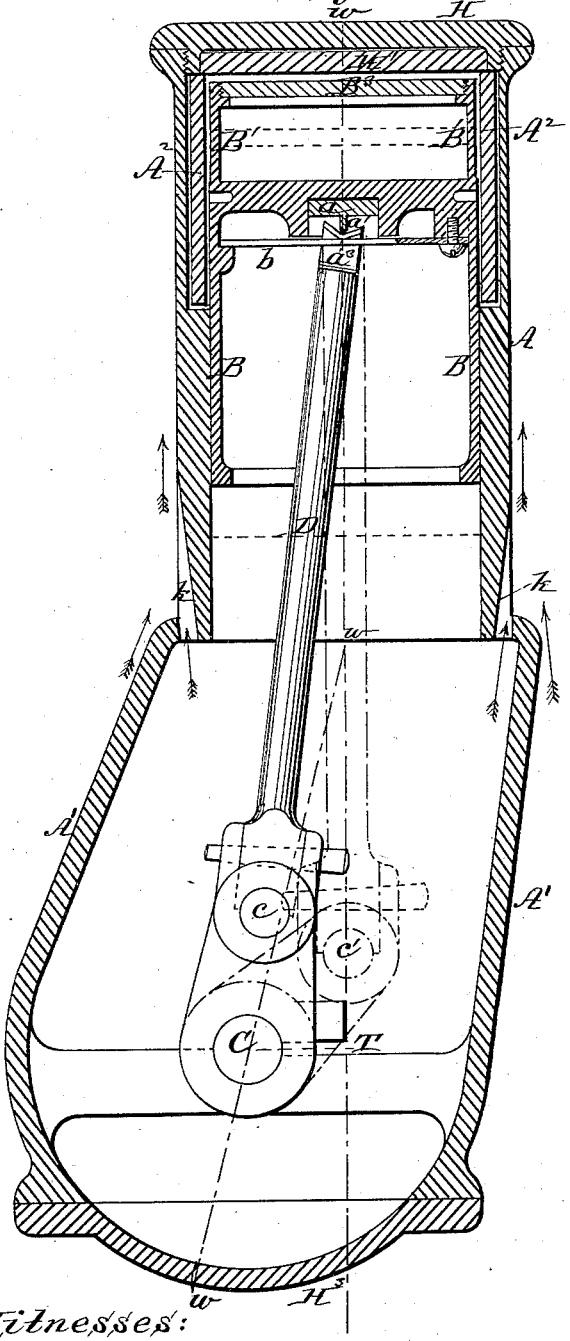
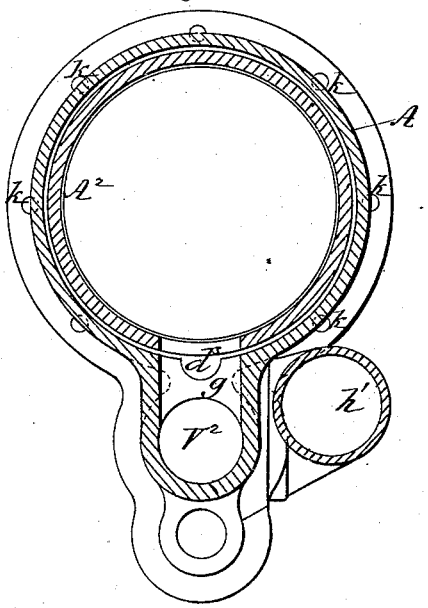
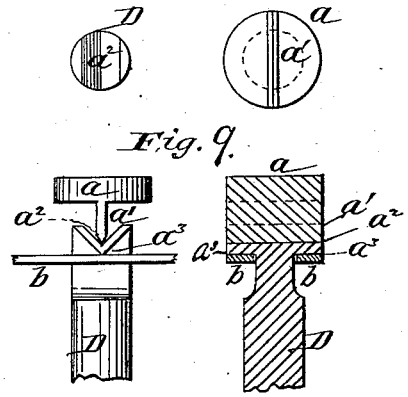
Witnesses:
T. C. Brecht
Lutie Norris.
Inventor:
Lewis H. Nash
by Johnson & Johnson
Att'ys.

(No Model.) 3 Sheets—Sheet 2.
L. H. NASH.
GAS ENGINE.
No. 312,494. Patented Feb. 17, 1885.
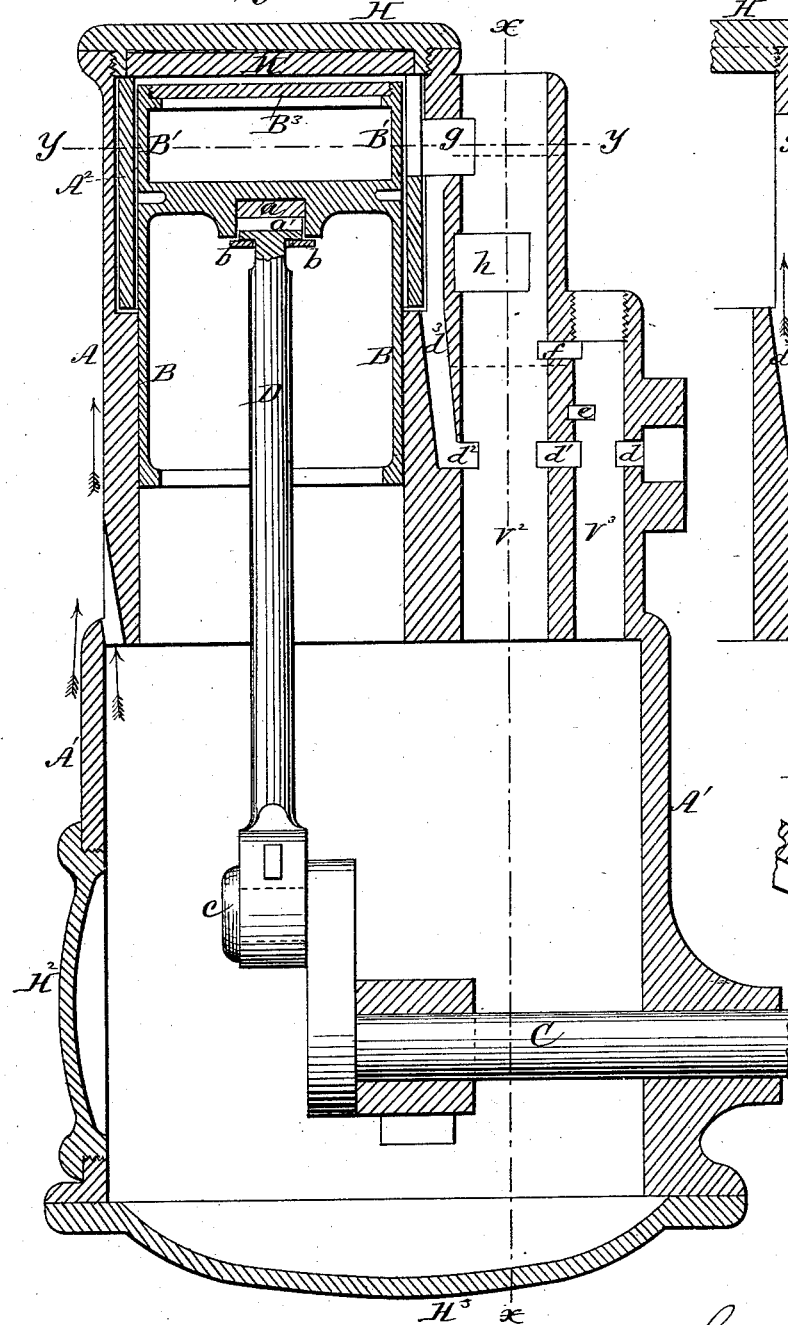
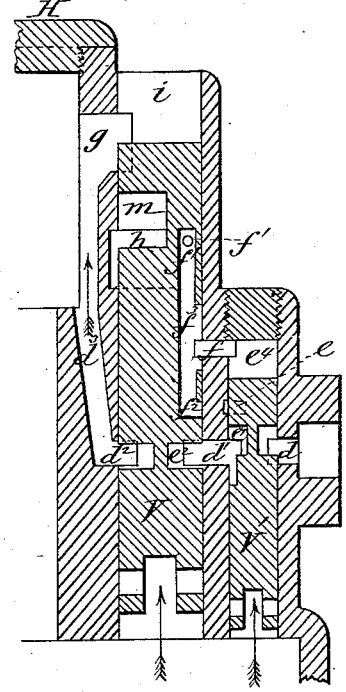
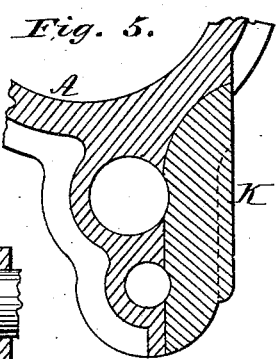
Witnesses:
Inventor:
Lewis H. Nash
by Johnson & Johnson
Att'ys (No Model.) 3 Sheets—Sheet 3.

L. H. NASH.
GAS ENGINE.

No. 312,494. Patented Feb. 17, 1885.

Witnesses:
T. C. Brecht
Lettie Norris

Inventor:
Lewis H. Nash
by Johnson and Johnson
Att'ys.

UNITED STATES PATENT OFFICE.

LEWIS HALLOCK NASH, OF BROOKLYN, ASSIGNOR TO THE NATIONAL METER COMPANY, OF NEW YORK, N. Y.

GAS-ENGINE.

SPECIFICATION forming part of Letters Patent No. 312,494, dated February 17, 1885.

Application filed February 6, 1884. (No model.)

*To all whom it may concern:*

Be it known that I, LEWIS HALLOCK NASH, a citizen of the United States, residing at Brooklyn, in the county of Kings and State of New York, have invented new and useful Improvements in Gas-Engines, of which the following is a specification.

The primary objects of my improvements are to operate a gas-engine in such manner as to prevent the suction action of the piston interfering with the positive and certain action of the lighter; to control the supply of gas to the lighter-jet in such manner as to prevent its extinguishment by the suction caused by the piston in its forward stroke; to provide such co-operating and controlling action of the valves as that one of them shall act as a gas-measuring device for the lighter, and also to close communication between the gas-main and the power-cylinder to prevent the piston sucking in a charge of gas and filling the lighter space before the lighting of the charge; to prevent the dilution of the charge in the cylinder by the waste gas leaking past the valves, caused from back-pressure in the cylinder, into the supply-passage; and to modify the heat of the power-cylinder by currents of cold air produced in and around the cylinder by the action of the piston.

A serious cause of trouble in gas-engines results from the action of imperfect valves, which allow a leakage of waste gases from the power-cylinder into the fuel-supply pipe, thus driving the pure gas back and filling or partially filling the pipes with a non-combustible mixture. This mixture is admitted to the engine again on the next stroke of the piston through the gas-supply valves, instead of pure gas, and the engine develops little or no power during this stroke; but upon the following stroke a charge of fresh gas is admitted and the engine develops full power, and thus receives a violent impulse which causes the waste gas from the power-cylinder to leak by the valves, as before, so that the following stroke is again weak. This adulteration of the gas supply causes an irregular and intermittent action of the engine; and my invention comprehends means by which this difficulty and objection is avoided, and the leakage allowed to escape into the open air instead of being forced back into the gas-supply.

My invention also embraces a novel method for cooling the power-cylinder by producing a forced draft of air around its exterior surface by the action of the piston in a manner to produce draft-currents in the outer air around the cylinder. Provision is made for modifying the heat of the power end of the cylinder, whereby the heat is slowly transmitted to the walls of the cylinder, in connection with means for producing forced currents of cold air around the exterior walls of the cylinder.

Having thus briefly stated the several matters of my invention, I will now more particularly describe the same in connection with the annexed illustrative drawings, preparatory to a designation by specific claim of the parts, combination, and methods which constitute my invention.

Figure 7:
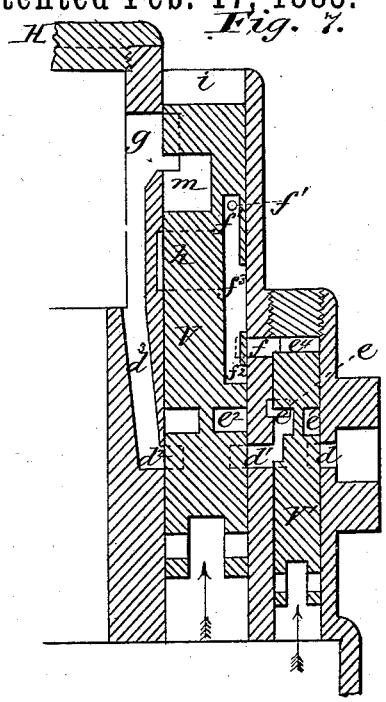
Figure 8:
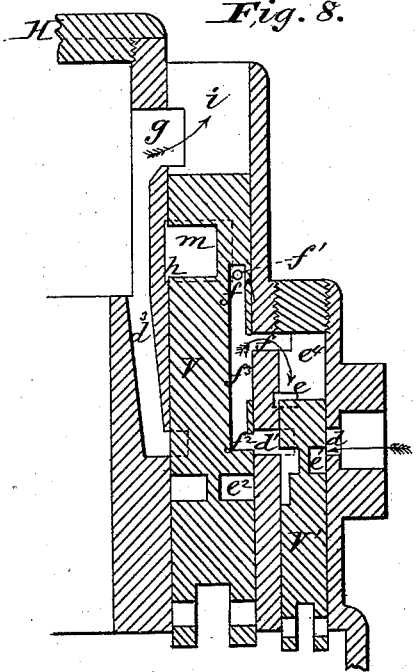

Referring to the drawings, Figure 1 represents a vertical central section of my improved gas-engine, showing the piston at the beginning of its stroke, and in dotted lines the position of the crank and connecting-rod at the instant of the ignition of the charge. Fig. 2 represents a vertical section taken on the line *w w w* of Fig. 1, showing the valves removed. Fig. 3 represents a vertical section on the line *x x* of Fig. 2 through the main valve-chamber, showing the main valve and its operating connections in elevation. Fig. 4 represents a horizontal section on the line *y y* of Fig. 2. Fig. 5 represents a partial vertical section on the line *z z* of Fig. 3, showing the movable plate by which access is had to the valve-connections. Figs. 6, 7, and 8 represent vertical sections through the valves, showing them in different positions; and Fig. 9 represents detail views of the knife-edge bearing for the piston and connecting-rod, and the springs for holding the connecting-rod in proper relation to the piston-bearing.

I have shown my invention as applied to a single-acting trunk-engine, A, having an inclosing-case, A', for the crank and valve connecting mechanism, and operating with a plunger-piston. That portion of the cylinder which forms the combustion-chamber is recessed around its inner wall to receive a cylinder, $A^2$, fitted loosely therein, so as not to have a close contact with the cylinder, in order not to readily transmit the heat thereto. The cylinder-head is also recessed to receive a thick plate, H', for the same purpose, which is fitted so as to rest upon the loose cylinder. These loose wall-plates form the combustion-chamber, and shield the cylinder from the direct contact of the gases, and do not become as highly heated as if they were thin plates. I prefer to use thick loose plates in an engine in which the charge is admitted to the cylinder at atmospheric pressure, and will not, therefore, absorb so great heat from the plate while being admitted. The piston B is formed with a closed chamber, B', on its back end, to serve as a shield to prevent the heat of the gases from being rapidly communicated to the bearing portion of the piston. The piston-shield is made of comparatively thin metal, so that the heat will travel slowly along it and be dissipated by the thicker metal of the piston.

I have shown the piston-chamber as being closed by a separate plate, $B^3$; but the plate may be cast with the shield.

I have shown in Figs. 1 and 3 the crank-shaft as being arranged at some distance to one side of the center line, $w\,w$ T, of the cylinder, so that as the crank moves from the position $c$ on the dead-center to the position $c'$ during the admission of the charge to the power-cylinder the position of the connecting-rod will approach the central line of the cylinder, and the charge will be ignited at that moment. Since the connecting-rod in this position is in line with the cylinder, as shown by dotted lines, all the power of the explosion of the charge will be transmitted directly to the crank, and the effective leverage exerted by the crank in producing rotation of the shaft is equal to the distance from the center line of the connecting-rod to the center of the crank.

I use a valve, V, which operates to admit the charge of air and gas to ignite the charge and to discharge the waste gases, in substantially the same manner as the single valve described in a patent granted to me February 6, 1883, No. 271,902, for gas-engine; but I combine with it an auxiliary valve, V', which co-operates with the main valve V to control the gas-supply to the main valve, and to co-operate with it to effect the lighting of the charge, free from the influence of the sucking action of the piston. The valves are of cylindrical form, and are operated by eccentric connections in the usual manner. The main valve V works in a cylindrical chamber, $V^2$, which opens at its upper end, $i$, into the external air. This chamber has a port, $g$, communicating with the power-cylinder, ports $h\,h$ on each side (see Fig. 3) communicating with the outer air and with a draft-chimney, $h'$, at the side of said chamber, and it has ports $f$ and $d'$, which communicate with the chamber $V^3$ of the valve V', and a port, $d^2$, admitting the gas by the passage $d^3$ to the power-cylinder. The chamber $V^3$ of valve V' has the port $d$, which communicates with the gas-supply, and the port $e$, which opens into the external air through the walls of said chamber. The main valve V has the lighter-chamber $m$, adapted to carry the flame from the port $h$ to the cylinder-port $g$ in the operation of the valve, a gas-passage, $f^3$, having a port, $f^2$, operating with the valve-chamber ports $d'$ and $f$, and it has a port, $e^2$, operating in connection with ports $d'$ and $d^2$, while the upper end of said valve operates with the port $g$ to admit the air and discharge the waste gases through the passage $i$. The passage $f'$ supplies the gas in a jet in the chamber $m$, to effect the lighting of the charge. A pipe, J, entering the base of the draft-chimney, opens close to the port $h$ and supplies the permanent lighter-jet J', (shown in Fig. 3,) to re-light the jet $f'$ at each stroke of the piston. The valve V' operates by its upper end the port $e$, and has a port, $e'$, which communicates with ports $d\,d'$ and with said port $e$ in the operation of the valve.

The operation of the valves is as follows: The piston being on its return-stroke, the valves V and V' in the positions shown in Fig. 8, the waste gases are forced through the ports $g$ and $i$ into the external air. At the same time gas is supplied to the engine through port $d$, and is admitted by valve V', through ports $e'$ and $d'$, and through ports $f^2$, $f^3$, and $f$ of valve V, to the chamber $e^4$ of valve V', driving the gases previously contained in $e^4$ through the outlet-port $e$ into the external air and filling the space with fresh gas. When the piston has completed its back stroke and begins its forward stroke, the valves will assume the position shown in Fig. 6, wherein port $e$ has been closed by valve V', and port $f^2$ has been closed by the valve V, while port $e^2$ has open communication between ports $d'$ and $d^2$, so that the gas is now supplied to the power-cylinder through ports and passages $d$, $e'$, $d'$, $e^2$, $d^2$, and $d^3$, while air is drawn in through ports $i$ and $g$, as shown by the arrows. The lighter-jet $f'$ now receives its only supply from the gas contained in chamber $e^4$ of valve V', and a continuous supply is maintained by the movement of the valve V' displacing said gas; hence as the valve V closes port $g$, as shown in Fig. 7, the forward motion of the piston causes a suction tending to suck out the gas through $f'$, and thus fill the lighter-chamber $m$, but is prevented by the plunger-valve V', which only allows the gas to escape from $e^4$ as fast as it is displaced by the motion of said valve, which thus acts as a compression-pump, forcing the gas contained in $e^4$ through the lighter-jet $f'$. By this means a definite quantity of gas is supplied to the jet $f'$, and the action of said jet rendered positive and invariable. The relighting of the jet and the lighting of the charge therefrom in the manner described, although in quick succession, has been found in practice to be unfailing, even at a rapidity in which the ignition has been effected at a rate of twelve times a second. This method of supplying the jet prevents the gas from being sucked away from the lighter by the operation of the piston and extinguishing it, or rendering it unreliable by drafts caused by the moving parts, because the gas being forced to the lighter-jet by the positive action of a moving plunger, it issues in a steady and uniform stream, and is not therefore liable to be extinguished.

Fig. 7 shows the position of the valves at the instant of the explosion, wherein valve V has closed air-inlet port $g$ and the gas-ports $d'$, $d^2$, and $f$, thus closing all communication with the outer air and with the gas-supply, except such as may escape by leakage.

In order to prevent any possible leakage from the cylinder-charge escaping into the gas-supply $d$, the valve V' has closed port $d$, and port $e'$ has opened port $e$; hence any leakage of the cylinder-charge into port $d'$ or by the end of the valve V' will escape into port $e'$ and out at port $e$ into the external air. I have shown the two valves V and V' as having these ports adapted to operate as described; but I do not confine myself to the exact arrangement of the said ports and passages shown, for their positions and arrangement are a matter which may be varied to suit convenience, so long as the two valves are combined to effect the following operations, viz: supplying the gas to the interior jet of the igniter of a gas-engine by means of a plunger-chamber and a plunger operated by the engine, adapted to force out a definite supply of gas for the lighter-jet at each stroke of the engine free from the influence of the sucking action of the piston. This function is complete, whether the plunger or valve V' operates also as a valve or not, for I may, if desirable, use a separate plunger for this purpose, and a separate valve, V', to control the admission of the gas.

While the valve V' is described as operating to force out the gas from the chamber $e^4$, yet the chief object of said chamber is to prevent the sucking action of the piston from extinguishing the light. The action of the moving piston in causing suction is more powerful in producing an increased flow of gas than is desirable, and the operation of the valve V' is not to produce a forced draft at the instant of explosion, as stated in English Patent No. 5,219 of 1880, but to prevent such action of the piston being communicated to the lighter-chamber. It must be remembered that the internal lighter-jet, $f'$, is not supplied by a combustible mixture, but with pure gas, and that if the chamber $m$ were filled with pure gas the light would be extinguished before the ignition of the charge could be effected.

Referring to the operation of my engine, it will be seen that when the valve V' is entering the chamber $e^4$ all communication between said chamber and the gas-supply is cut off, and hence there can be no sucking action to draw gas to supply the lighter-jet $f'$ faster than the plunger-valve V' allows it to flow.

To effect the cooling of the power-cylinder I have arranged air-passages $k$ opening at the base of the cylinder and at intervals around it into the interior of the inclosing-case A', as shown in Figs. 1, 2, and 4. As the piston moves forward in its stroke, it will displace an amount of air from the interior of the chamber A', which will be forced out of the holes or passages $k$ $k$ in strong jets or currents, so as to traverse the outer surface of the power-cylinder A, as indicated by the arrows, and cool it. The jets will also cause a draft of air along the interior of the entire engine-frame. Upon the backward stroke of the piston the exterior air will be drawn in through the holes $k$ $k$, causing a draft of air in the reverse direction. These forced air-jets serve to reduce the heat of the open end of the cylinder and of the casing, while the loose cylinder $A^2$ and plate H' serve to prevent the rapid transmission of heat to the closed end of the cylinder. The piston connecting-rod D has the usual form of bearing upon the crank-pin $c$; but it has a knife-edge bearing upon the piston, which consists of a steel seat, $a$, centrally secured in a recess on the under side of the piston, formed with a knife edge or blade, $a'$, adapted to fit within a V-shaped groove, $a^2$, formed in the end of the connecting-rod. Back of the groove $a^2$ the connecting-rod is formed with knife-edge bearings $a^3$ $a^3$, which stand in vertical line with the knife-edge $a'$ of the piston and project from opposite sides of the connecting-rod. Two plate-springs, $b$ $b$, serve to maintain the connecting-rod in proper bearing relation upon the knife-edge $a'$ by their arrangement on the back of the piston, so as to stand on each side of the piston-rod. The action of these springs is to bear upward upon the side knife-edges of the rod D, so that the latter will rock upon a knife-edge bearing and the springs will take up the wear. As this peculiar piston-rod bearing forms the subject of a separate application for a patent filed by me, hereinafter designated, it need not be further described herein.

I may use my method of operating a gas-engine to obtain the advantages stated, whether the connecting-rod operates with slideways or as shown.

The inclosing-case is provided with a removable plate, $H^2$, through which access is had to the working-connections, and provision is made for access to the valve-connections by a removable plate, K. (Shown in Figs. 3 and 5.)

In another application for a patent filed by me May 2, 1884, Serial No. 130,182, I have specifically claimed the knife-edge bearing for the piston in its construction, combinations, and application to steam and other engines, and it is therefore not claimed herein.

I claim—

1. The method herein described of preventing the extinguishment of the lighter-jet by the inward suction of the piston of a gas-engine before the ignition of the charge, which consists in cutting off communication between the gas-main and the power-cylinder during the measuring function of the lighter-controlling supply, substantially as described.

2. The method herein described of isolating the lighter-jet from the forced draft of the cylinder caused by the inward suction of the piston, which consists in causing the valve V' to enter the chamber $e^4$ to supply the interior jet with a measured quantity of gas at the moment communication is cut off between the gas-supply and said chamber, and thereby prevent the filling of the lighter-chamber and the extinguishment of the lighter-jet before the ignition of the charge, substantially as described.

3. The combination, with the cylinder and the piston of a gas-engine, of the valves V V', the latter constructed and co-operating with the lighter-jet, the chamber $e^4$, the lighter-space $m$, and cylinder-port $g$, to prevent the piston from sucking gas and filling the lighter-space before the cylinder-port is opened sufficiently to ignite the charge, substantially as herein described.

4. The method herein described of preventing the dilution of the gas supplied to the engine caused by the back-pressure of waste gas leaking by the valves, which consists in diverting the waste gases of leakage from the gas-supply passage into an exhaust-passage controlled by a valve operated by the engine, substantially as described.

5. The method herein described of producing forced currents of air around and in contact with the exterior walls of a gas-engine, consisting in forcing air in jets in contrary directions along the external walls of the cylinder and casing, the said contrary jets being produced by the forced displacement of the air from the inclosing-case through jet-openings contiguous to the cylinder-walls, substantially as set forth.

6. The combination, in a gas-engine, of an interior lighting-jet, $f'$, supplying gas to the igniter, with the plunger-valve V', the chamber $e^4$, and the main supply-valve V, the said valve V acting as a measuring device for the lighter-chamber, and also to close communication between the gas-main and the power-cylinder to prevent the piston from sucking a charge of gas and filling the lighter-chamber before the ignition of the charge, substantially as herein set forth.

7. In combination, in a gas-engine, the cylinder having port $g$ and passage $d^2 d^3$, the main supply-valve V, having lighter-chamber $m$, port $e^2$, passage $f^2 f^3$, and lighter-jet $f'$, operating in a chamber, $V^2$, having lighter-port $h$, and ports $f$ and $d'$, and opening $i$, and the cut-off valve V', having the port $e'$, operating in chamber $V^3$, having ports $d \cdot e$, and from which the gas is displaced in a definite quantity to the lighter-jet, substantially as described.

8. The combination, in a gas-engine, of the main valve, constructed substantially as described, with a gas-supply valve, V', and a chamber within which it operates, having an exhaust-port, $e$, operated by said valve V', whereby to divert the waste-gas leakage from the gas-supply passage, substantially as described.

9. In a single-acting gas-engine, the passages $k$ around the open end of the cylinder, opening into the casing A' and outside of the cylinder-wall, for the purpose described.

10. The combination of the cylinder having its combustion-chamber lined with a loose cylinder, $A^2$, and a loose plate, H', with the air-jet passages $k$ in the wall of the cylinder around its open end opening into the casing, as described, for the purpose of modifying the heat of the cylinder.

11. The combination, with the cylinder of a gas-engine, having its combustion-chamber formed of the loose cylinder $A^2$ and the loose plate H', of the piston having a thin cylinder, B', cast on its back end, for the purpose specified.

In testimony whereof I have hereunto set my hand in the presence of two subscribing witnesses.

LEWIS HALLOCK NASH.

Witnesses:
H. W. BRINCKERHOFF,
CHRISTOPHER C. WHITTEMORE.